UNITED STATES PATENT OFFICE.

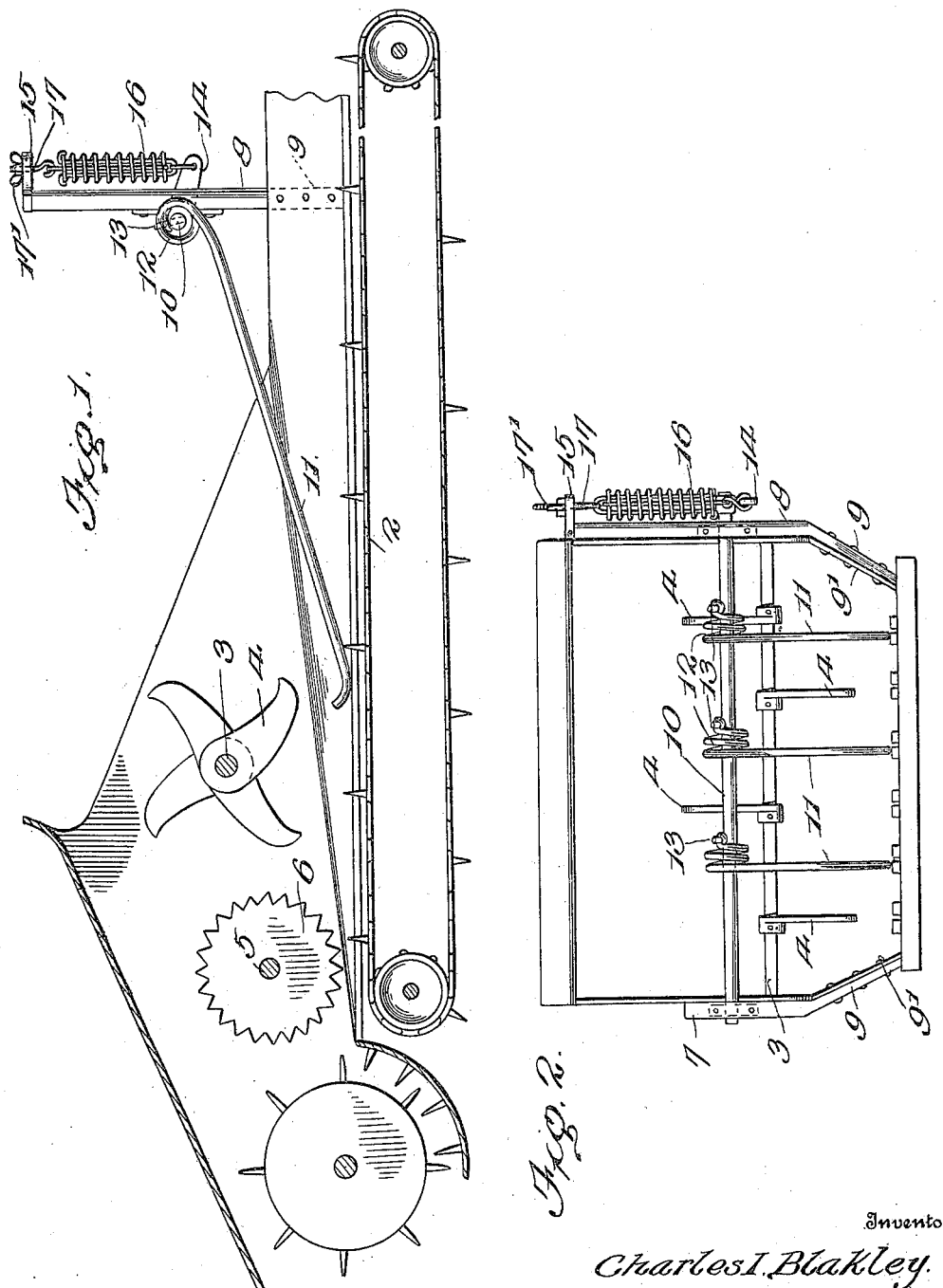

CHARLES I. BLAKLEY, OF LAMONT, OKLAHOMA.

BAND-CUTTER AND FEEDER.

963,270. Specification of Letters Patent. Patented July 5, 1910.

Application filed May 20, 1909. Serial No. 497,227.

*To all whom it may concern:*

Be it known that I, CHARLES I. BLAKLEY, a citizen of the United States, residing at Lamont, in the county of Grant and State of Oklahoma, have invented certain new and useful Improvements in Band-Cutters and Feeders, of which the following is a specification.

My invention relates to feed chutes of hay and straw stackers, threshers, carriers, etc., and particularly to means for holding and retarding the straw or hay being carried along the conveyer chains to the beaters and cutting knives, and other like parts, the retarding mechanism being so arranged that the material shall be fed evenly and thoroughly to the band cutting knives and beaters.

The object of my invention is to provide adjustable, resilient fingers which extend down in the path of the moving straw or like material and act to retard the passage of the material along the conveyer chains.

This invention consists in the arrangement of parts and details of construction as hereinafter set forth and more specifically stated in the claims appended.

The drawings show the application of my invention to the feed chute of a threshing machine, and therein—

Figure 1 is a longitudinal section of a feed chute of a threshing machine with my invention applied thereto; and, Fig. 2 is a rear elevation of the chute with the spring-fingers attached.

Referring to the drawings, 2 designates the conveyer belt of an ordinary threshing machine or other straw feeder. This conveyer belt is constantly moving in the direction of the beaters 4 which are mounted upon a rotatable shaft 3 and in advance of the band cutters 6 which are mounted upon a shaft 5. It will be understood that this arrangement of beaters and band cutters is purely illustrative, as I do not wish to limit the application of my invention to any particular form of a hay or straw treating machine.

In advance of the beaters 4 I provide opposed upright standards 7 and 8, preferably formed of tubing, the lower ends of these standards being inwardly and downwardly inclined or bent, as at 9, to fit the inclined sides 9' of the chute. The standard 8, for a reason hereinafter stated, is of greater length than the standard 7.

Mounted in bearings in the standards 7 and 8 is the transverse shaft 10 upon which are carried a plurality of forwardly and downwardly extending fingers 11, these fingers or rods extending forward to a point immediately beneath the shaft 3. While I may attach these fingers in any desired manner to the shaft 10, preferably I form the upper end of each of the fingers into a coil 12, the extremity of the coil being inserted through a transverse opening in the shaft 10 and then provided with a nut 13 whereby the coil and its extended finger may be attached rigidly to the shaft so as to turn with it when the shaft turns. There are, of course, as many of these spring fingers as may be deemed necessary, these fingers extending downwardly to a point just above the conveyer belt and being then bent slightly upward so as to prevent the hay or straw from catching or clogging, and permit the fingers to be raised to allow the conveyer to pass along their path and to carry the hay with it. It will be seen that each of the fingers is individually resilient and that therefore they will yield individually, but that at the same time they will act to retard any large masses of straw which may pass along the conveyer and distribute the same before the passage of the straw to the beaters. In order to provide means whereby the resiliency of the fingers as a whole may be adjusted, I attach to the end of the shaft 10 a rearwardly projecting arm 14. The upper end of the standard 8 is provided with a projecting lug 15 which is perforated for the passage of the eye bolt 17 having thereon the wing nut 17'. A coiled spring 16 is attached to the extremity of the arm 14. It will be seen that by adjusting the bolt 17 by means of the wing nut 17' or in any other desired manner, the tension of the spring will be either increased or decreased, thereby drawing with more or less force on the arm 14 and thereby resisting with more or less force the partial rotation of the shaft 10. By this means I provide a series of spring fingers which are individually resilient sufficient to allow the passage of the straw along the conveyer and yet retard the same, and in which the tension may be increased as a whole without the necessity of increasing individually the tension of each finger. Not only would it be considerable trouble to individually increase the tension of each finger and, indeed, almost impossible with a simple arrangement of spring such as I have shown, but there would be great liability of the tension being different for each of the fingers. Hence, it will be seen that my construction provides a very simple way of regulating the downward pressure of the fingers without changing their individual resiliency and a way which permits all of the fingers to be easily and quickly adjusted in the midst of the operation.

Having described my invention, what I claim is:

1. In band cutting and feeding mechanism, the combination with a chute, of a plurality of spring fingers extending downward and forward into said chute, each of said fingers being resiliently supported at its base, the fingers being entirely independent of each other from the point of attachment at the base to the extremity of the fingers, and each finger having independent movement, and means whereby all of the spring fingers together may be resiliently depressed or elevated as a whole.

2. In band cutting and feeding mechanism, a chute, a shaft transverse to the chute, a plurality of spring fingers attached at their rear ends to the shaft and projecting downward and forward into the chute, each being resiliently supported at its base on said shaft and each finger being entirely independent of any other finger from its base to its extremity, a spring resisting the rotation of the shaft and the elevation of the extremities of all the fingers, and means for adjusting the tension of the spring.

3. In band cutting and feeding mechanism, a chute, a transverse rock shaft therein, a plurality of fingers projecting downward and forward from the shaft and adapted to engage the straw in its passage through the chute, said fingers being entirely independent of each other from their point of attachment to the shaft to their extremities, the rear ends of said fingers being resiliently connected to the shaft for independent movement, an arm projecting from the shaft, a spring attached to the end of said arm, and means for adjusting the tension of the spring.

4. In mechanism of the class described, the combination with a chute, a series of rotary beaters and a conveyer movable on the bottom of the chute to and past said beaters, standards attached to either side of the chute, a transverse shaft supported in the standards, a series of resilient spring fingers mounted on said shaft and projecting forward and downward toward the conveyer to a point immediately beneath the shaft of said beaters, said fingers being entirely independent of each other and freely movable from their point of attachment to the shaft to the extremities of the fingers, an arm on the extremity of the finger supporting shaft, an ear in the upper end of the adjacent standard, and a spring attached at one end to said arm and at the other end to a tension adjusting device passing through the ear.

5. The combination with a chute, a conveyer traversing the bottom of the chute, rotatable beaters and band cutters mounted in the chute above the conveyer, of standards attached to the sides of said shaft, a shaft mounted in said standards for rotation, an arm projecting from the shaft, a spring adjustable at its upper end to one of said standards and extending down to the extremity of the arm, a series of spring fingers attached at one end to the shaft and extending forward and toward the said conveyer, the extremities of said fingers being coiled to form each a spiral, the extremity of the material forming the spiral extending transversely through said shaft, and a nut attaching the fingers to said shaft, said fingers being entirely independent of each other from their point of attachment to the shaft to the extremities of the fingers.

In testimony whereof I affix my signature in presence of two witnesses.

CHARLES I. BLAKLEY. [L. S.]

Witnesses:
C. R. REED,
H. A. HEBERLING.